United States Patent [19]

Durst et al.

[11] Patent Number: 4,770,885
[45] Date of Patent: Sep. 13, 1988

[54] ICE CREAM CONVEYOR LINE TRAY AND SYSTEM

[75] Inventors: Richard E. Durst; Edward M. Wight, both of Austin, Tex.

[73] Assignee: APV Glacier Industries, Inc., Austin, Tex.

[21] Appl. No.: 883,034

[22] Filed: Jul. 8, 1986

[51] Int. Cl.$^4$ .......................... A23G 9/00; B65G 17/34
[52] U.S. Cl. ....................................... 426/421; 62/345; 198/793; 425/126.2; 426/515
[58] Field of Search ................. 198/793, 465.2, 469.1, 198/803.01, 803.14; 426/421, 515; 425/126 S, DIG. 219, 500, 501, 509, 511, 517; 62/63, 345, 374, 380

[56] References Cited

U.S. PATENT DOCUMENTS

| | | | |
|---|---|---|---|
| 1,813,794 | 7/1931 | Bunce | 198/793 |
| 2,096,959 | 10/1937 | Clerc | 198/793 |
| 2,354,939 | 8/1944 | Brock | 198/803.15 |
| 2,677,943 | 5/1954 | Nelson et al. | 198/793 |
| 2,884,875 | 5/1959 | Rasmusson | 425/126 S |
| 3,780,852 | 12/1973 | Weiss et al. | 198/793 |
| 4,155,689 | 5/1979 | Getman | 425/114 |
| 4,157,650 | 6/1979 | Guibert | 62/380 |
| 4,209,288 | 6/1980 | Tumey et al. | 425/DIG. 219 |
| 4,527,972 | 7/1985 | Carlsson | 425/126 S |

Primary Examiner—Stephen J. Novosad
Assistant Examiner—Bruce M. Kisliuk
Attorney, Agent, or Firm—Lahive & Cockfield

[57] ABSTRACT

A tiered ice cream product tray for attaching to a conveyor includes a sheet member with a mounting region for affixing the sheet to the conveyor, and a support region extending therefrom and including vertically offset horizontal portion support tables. At least one region of the sheet member extends transversely between an upper end thereof at a first product support table, and a lower end thereof at an adjacent product support table. An ice cream product fabrication system includes a conveyor oriented along a direction of conveyor motion and having a plurality of such trays attached thereto. The vertical regions of the tray are aligned parallel to the direction of motion of the conveyor. A preferred embodiment of the system fabricates ice cream portion having a thickness t, and the vertical faces have a height at least (t/2). The system includes a stick inserting work station for inserting a stick into ice cream portions along a horizontal direction transverse to the direction of motion. The products may be oriented such that an inserted stick in an upper portion extends over a lower portion without touching it, in a shingled array along the conveyor, to provide significant economy of tray space. Diverse trays, and methods of fabricating ice cream products are shown.

20 Claims, 4 Drawing Sheets

ICE CREAM CONVEYOR LINE TRAY AND SYSTEM

TECHNICAL FIELD

The present invention relates to a conveyor line for the production of portions of a frozen comestible, and to the manufacturing of ice cream novelties. In particular, it relates to the manufacturing of ice cream novelties wherein the manufacturing is performed by depositing a portion on a tray carried by a conveyor along a production line, and wherein the portion is subject to treatment or manipulation at one or more work stations along the line so as to form a completed product. Examples of such products are ice cream bars of the type having a stick inserted therein as a handle.

Such a prior art production line is shown in FIG. 1, and includes a conveyor line 1 carrying trays 2 past ice cream depositing or forming work stations 3, 4 into a freezing chamber 5. As shown, ice cream portions 10 are deposited on trays 2 by an ice cream extruder work station 3. A second work station 4 inserts a stick 12 in each portion 10. The conveyor trays 2 move continuously in the direction indicated by arrow 14. Preferably each work station 4, other than the forming work station, is mounted on a platform for reciprocal motion back and forth adjacent to the conveyor line. The operation of such a work station is synchronized so as to perform its product decorating or stick inserting operation while in motion parallel to and at the same speed as the conveyor. This eliminates relative motion between the work station and the conveyor while the ice cream portion is worked on.

A typical tray as used in such a prior art conveyor is a rectangular or square tray having a length or width dimension in the range of 8 to 12 inches. On one such tray, one or more ice cream portions may be deposited. The total output capacity of such a prior art production line, and the optimum utilization of the work stations 3, 4 as well as the freezing chamber 5 depends on the number of ice cream portions which may be deposited on one tray.

OBJECTS AND SUMMARY OF THE INVENTION

It is an object of the invention to provide an improved product tray for a frozen comestible conveyor line.

It is another object of the invention to provide a product tray having plural discrete product supporting regions.

It is another object of the invention to provide a product tray having a tiered surface.

It is another object of the invention to provide a product tray for receiving portions of comestible product in a conveyor line and holding the completed product in overlapping non-contacting layers.

It is another object of the invention to provide a product tray for supporting product portions arrayed along plural distinct directions on the tray while permitting uniform access to a corresponding side of each said portion.

It is another object of the invention to provide an improved method of producing ice cream portions in an ice cream production line.

These and other features of the invention are obtained in a product tray for attaching to a conveyor, in which a sheet member has a flange region for affixing the sheet to the conveyor, and a support region, extending from the flange, including plural contiguous substantially horizontal product support tables. At least one vertical region extends between an upper end thereof at a first product support table, and a lower end thereof at an adjacent product support table.

A system according to the invention includes a conveyor oriented along a direction of conveyor motion and having a plurality of trays attached thereto. Each tray has plural horizontal product support regions separated by vertical faces of the tray. The vertical faces of the tray are aligned parallel to the direction of motion of the conveyor. In a preferred embodiment, the system is intended for the fabrication of ice cream portions having a thickness t, and the vertical faces have a height greater than (t/2). The system includes a stick inserting work station for inserting a stick into each ice cream portion along a horizontal direction transverse to the direction of motion. The products are preferably oriented such that an inserted stick in an upper portion extends over a lower portion without touching it, so that the finished portions are "shingled" along the conveyor, resulting in significant economy of tray space.

A method of forming portions of frozen comestible product in a production line according to the invention includes the steps of depositing the portions on plural vertically offset regions of a tiered tray, and forming said product such that a product on an upper tier at least partially overlaps a lower tier.

BRIEF DESCRIPTION OF THE DRAWINGS

These and other features of the invention will be understood with reference to the Figures, in which.

DETAILED DESCRIPTION

Figure 2:
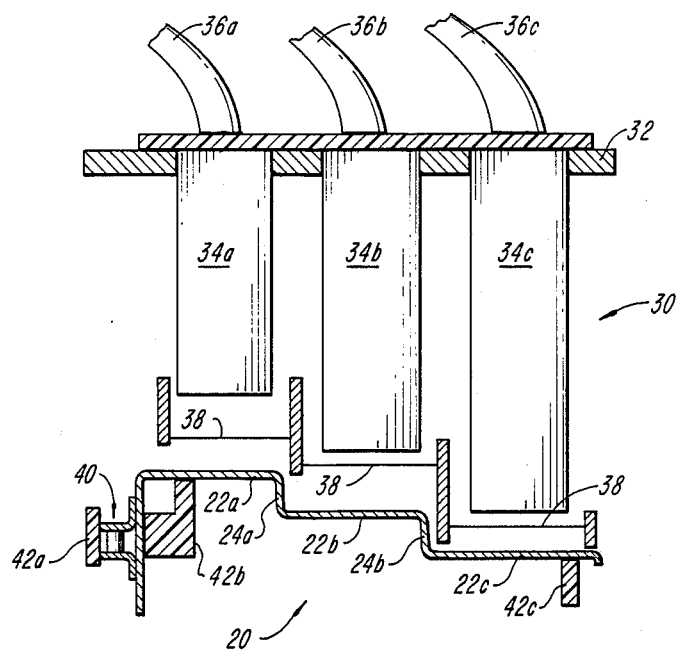
FIG. 2 shows a cross-sectional view of an exemplary ice cream product tray according to the invention.

FIG. 2 is a cross-sectional view of a tray and conveyor at a work station of an ice cream production line according to one embodiment of the invention. The conveyor moves along a direction of motion oriented perpendicular to the plane of the drawing, carrying a tiered tray assembly 20 beneath an extrusion nozzle assembly 30. A nozzle plate 32 supports a plurality of extrusion nozzles 34a, 34b, 34c, which are supplied with partially frozen ice cream product under pressure by corresponding inlet pipes 36a, 36b, 36c. In operation, the nozzles each extrude a portion of ice cream onto tray 20 below, and heater wires 38 sever each portion from its nozzle as the tray moves. Each nozzle is aligned over a corresponding horizontal support region 22a, 22b, 22c of the tray. The support regions are offset by vertical portions of the tray 24a, 24b. As discussed more fully below in connection with the preferred method according to the invention, the vertical faces 24a, 24b provide a vertical offset which is preferably somewhat greater than the thickness of an intended ice cream product. Tray assembly 20 is carried along a conveyor chain 40, and is supported by conveyor support rails 42a, 42b, 42c. Rails 42b and 42c provide a sliding support surface for the tray, and rails 42a and 42b laterally constrain and support the chain.

Figure 3:
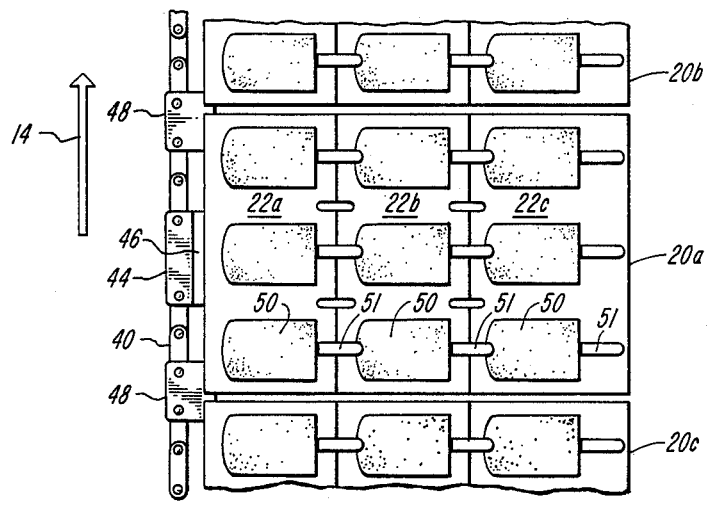
FIG. 3 shows a top view of the tray of FIG. 2 in a product conveyor line.

FIG. 3 shows a top view of a tray as in FIG. 2, in a production line according to a preferred practice of the invention. As shown, the chain 40 has sequentially attached thereto a plurality of identical tiered trays 20a, 20b, 20c. Each tray in the illustrated embodiment includes three level tiers 22a, 22b, 22c. Each tray 20 is attached to the chain 40 by bolting to a connecting link of chain 40, shown illustratively for tray 20a as a connecting link 44. Additionally, it has been found desirable to provide support links 48, similar to link 44, at intermediate positions along the chain to provide a surface along which a leading and a trailing edge of the tray may rest. The trays are not attached, however, to additional link 48, but pivot freely into a supported position as the conveyor chain passes around curves in the production line.

Shown on tray 20a are a plurality of ice cream portions 50 each having a stick 51 inserted therein. The portions 50 may be deposited by three separate work stations having laterally offset extrusion nozzles, or may be deposited by a single three nozzle work station, as shown in the sectional view, FIG. 2. Each portion 50 on tray 20a has a stick 51 inserted therein. The stick 51 of a portion on an upper tier extends over a portion 50 on the next lower tier so as to form a shingled, non-contacting array of stick product portions on the tray. The front-to-back depth of a tier is thus less than the dimension of a finished product. This results in an improved utilization of available space on the conveyor line, resulting in greater product throughput and more efficient siting of equipment.

Each stick 51 is inserted into an ice cream portion 50 along a horizontal axis transverse to the direction of conveyor motion. Because each horizontal product support region 22a, 22b is oriented parallel to the direction of motion, a multiple stick insertion head can be placed over the conveyor so as to clear the product portions and simultaneously insert sticks into vertically offset adjacent portions supported on the tray. Alternatively, conventional single stick inserting work stations may be employed, at staggered positions along the conveyor line, to each insert sticks in a single vertical rank of ice cream portions along one level of the trays. Staggered single-stick inserters may also be used, in conjunction with corresponding staggered extrusion nozzles, to insert sticks in ice cream product portions at the nozzle, before severance and deposit of the portions on the trays. For operation of a shingled product assembly line as shown in FIG. 3, the vertical offset provided by walls 24a, 24b (FIG. 2) must be at least somewhat greater than one half the thickness of a product portion. In the illustrated embodiment, each tray has a width of 11 3/16 inches, and has three tiers each approximately six inches deep. The tiers are offset by two inches vertically. Such a tray carries up to nine portions having dimensions of up to five inches long by three and one-fourth inches wide by one and one-fourth inches high, exclusive of the stick, resulting in high utilization of the horizontal tray surface.

FIGS. 4A, 4B, 4C and 4D show views of the tiered tray 20 of FIGS. 2, 3 according to the invention, configured for transport by a chain-driven conveyor, which moves along direction 14. Tray 20 is preferably stamped of twenty gauge stainless steel sheet material. An attachment link 44 provides a bracket with a vertical face 46 to which the tray 20 bolts along a turned-down inner face, shown in FIG. 4B. Three adjacent product support tables 22a, 22b, 22c extend horizontally from the inner face perpendicular to the direction of motion. Spot welds 23 secure one or more stiffening brackets to the underside of the tray, as discussed below. In addition, a stamping 27 (shown in phantom) is spot welded below the tray to stiffen the corner of flange 26 and table 22a.

Figure 4A:
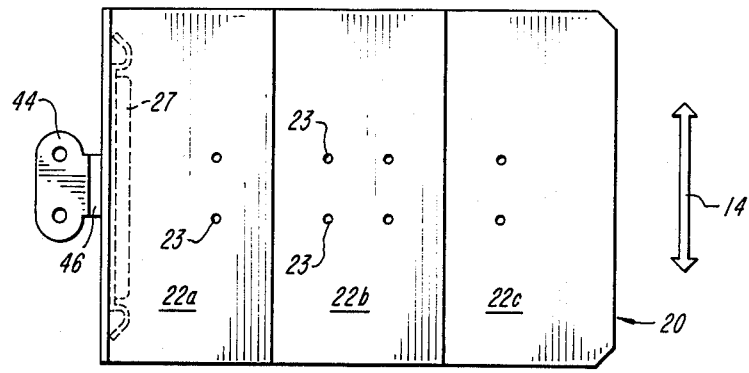
FIGS. 4A, 4B, 4C and 4D show views of the tray of FIGS. 2, 3.
Figure 4B:
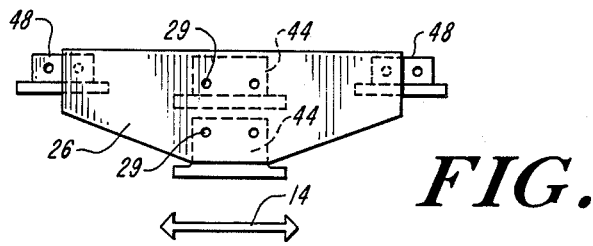

FIG. 4B is a horizontal side view of the tray taken perpendicular to arrow 14, showing the folded-down inner face 26 of the tray with mounting holes 29. Attachment links 44 are shown in phantom with bolt holes mating with the holes 29 of face 26.

Two further attachment links 48 are mounted on the conveyor chain at positions underlying the edge of tray 20 and an adjacent tray. These links are not bolted to a tray, but serve to provide a support for the edge of the tray to keep it square with the chain axis. One or more stiffening slippers formed of sheet stock (not shown), or a combination of brackets and plates, may also be affixed to face 26 to reinforce the tray.

Figure 4C:
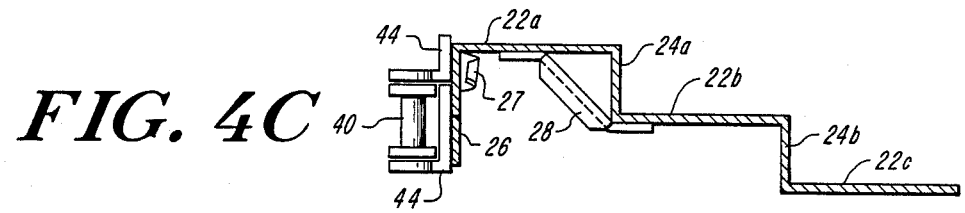

FIG. 4C shows a side view along the transport axis of tray 20, attached by upper and lower links 44 to chain 40. Vertical face 24a extends from product support table 22a to product support table 22b, providing a vertical offset therebetween. A stiffener 28 is spot welded across the corner of portions 22a, 24a, 22b providing tray rigidity. Another stiffener, not shown, braces the corner between plates 22b, 22c, and further stiffeners may be spaced as needed for longer trays along the direction of travel.

Figure 1:
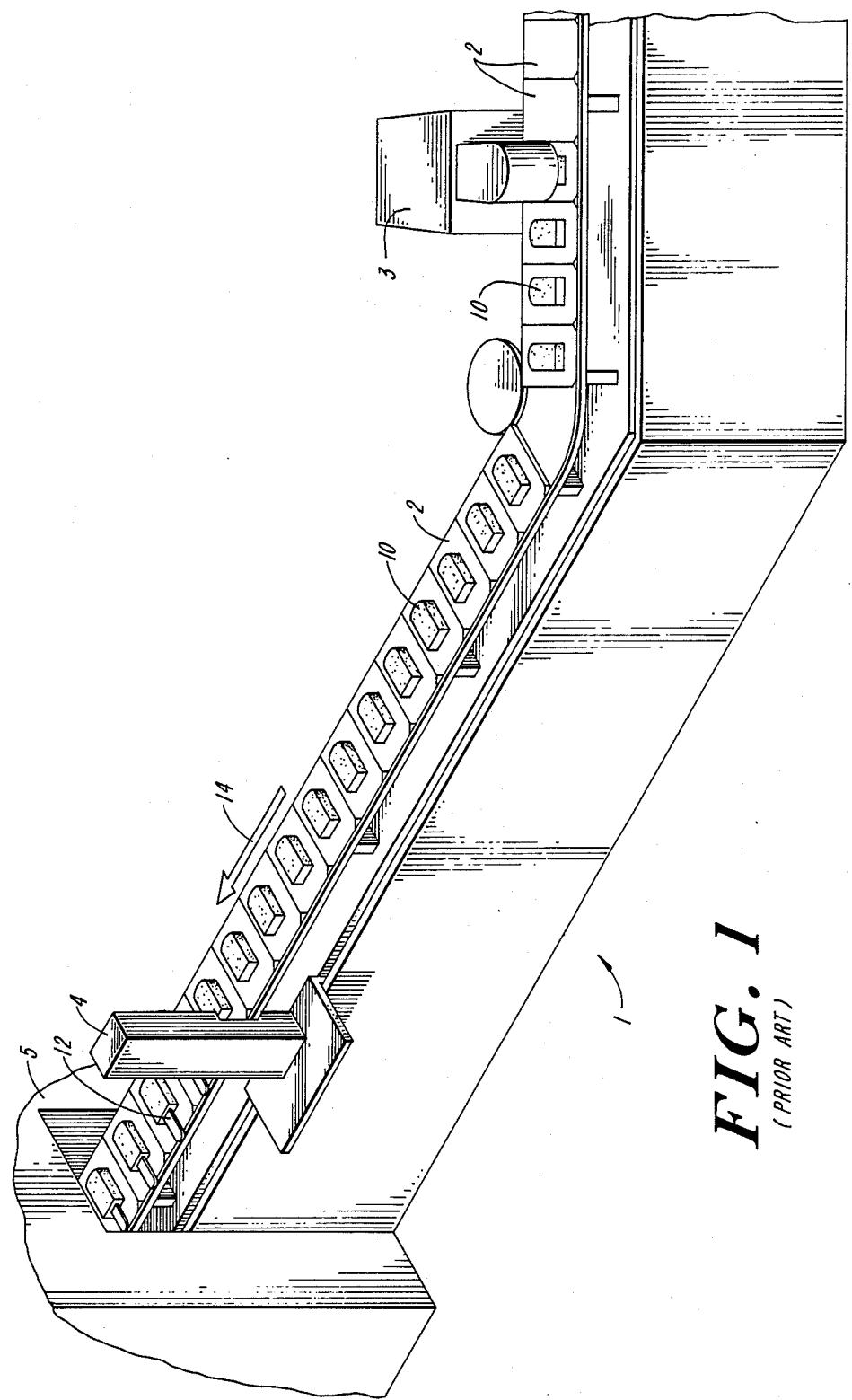
FIG. 1 shows a prior art ice cream production line.
Figure 4D:
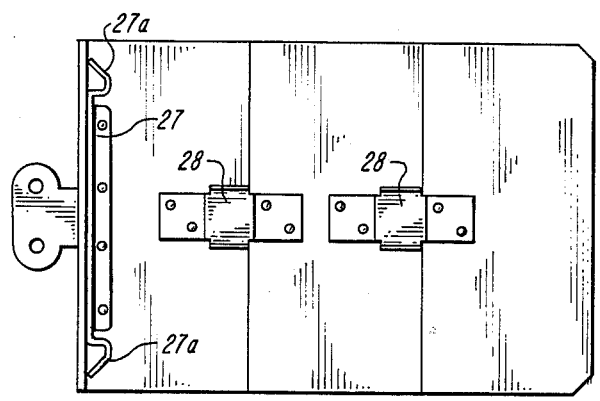

FIG. 4D is a bottom view of the tray, showing corner stamping 27. Stamping 27 is a generally L-shaped member which is affixed to the corner region of faces 26, 22a to reinforce the bend. One face of the L extends at either end of the member and is bent down to form a curved guide shoe 27a. This assures good entry between the guide rails 42a, 42b (FIG. 1), and takes up the clearance between the support guides.

Figure 5:
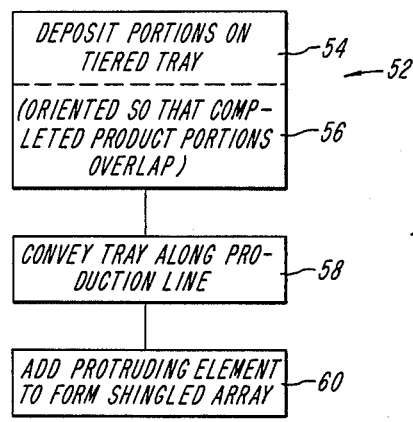
FIG. 5 is a block diagram of a method according to the invention.

FIG. 5 shows a method 52 according to the invention for the production of ice cream portions which are treated or otherwise processed to have a laterally protruding element projecting therefrom, such as an ice cream stick. The method includes the steps of depositing 54 a said product portion on a tray having plural vertically offset product support regions. In this manner, vertical clearance is provided offering improved opportunities for the placement, with respect to the conveyor, of a workstation such as a stick insertion workstation, for attaching the laterally-projecting element to the product. In a further aspect of the invention, the method includes the steps of 54, 56 depositing the said portions, at each vertical level of the tray, in a regularly spaced rank, and, 58 conveying the tray along the production line, and 60 inserting a stick in a portion such that the the stick extends from the portion and overlies a lower level of the tray, so as to achieve a generally shingled arrangement of product on the conveyor tray. The stick may overlie the product portion on the next lower tier of the tray. The method may be applied to the production of other comestible portions having a protruding element.

By thus vertically overlapping the areas occupied by each finished product, a greater density of product on the tray, hence greater product throughput, is achieved. Using, by way of illustration, the tray of FIGS. 2–4 as an example, the vertical faces 24a, 24b are oriented along the direction of travel of the conveyor. The product portions supported by the tray are thus presented, to a work station adjacent to the conveyor, as plural rows of product, each row being both vertically and horizontally offset from the adjacent rows. This allows the work station access to all the portions along the same direction, without obstruction.

With specific reference to the illustrated embodiment of the tray, an improved method according to the invention includes the steps of conveying, along a first horizontal direction of motion, a tray having vertically offset product support regions separated by vertical faces oriented along the direction of motion; depositing, on said horizontal support faces, product portions; and inserting along a horizontal direction transverse to said direction of motion, a product stick in each said portion. According to a further preferred embodiment, the product sticks may be simultaneously inserted in plural said portions by a multi-stick insertion work station.

Figure 6A:
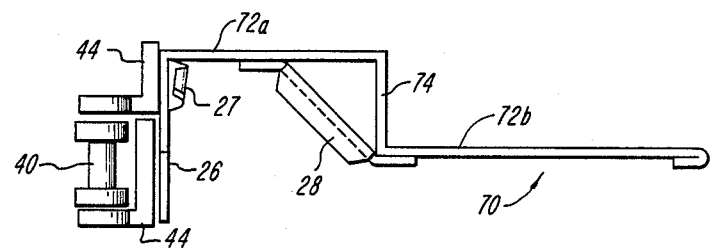
FIGS. 6A, 6B show sections of trays of other embodiments of the invention.

FIG. 6A shows a section corresponding to the section FIG. 4C of a tray 70 of a presently-preferred embodiment of the invention, having an upper tier 72a and a lower tier 72b, connected by vertical face 74. Tier 72b, located furthest from the conveyor chain, is wider than tray 72a. In a system utilizing tray 70, products deposited on upper tier 72a overlap products on lower tier 72b, and lower tier 72b is of a width to fully accommodate the products deposited thereon without overlap.

Figure 6B:
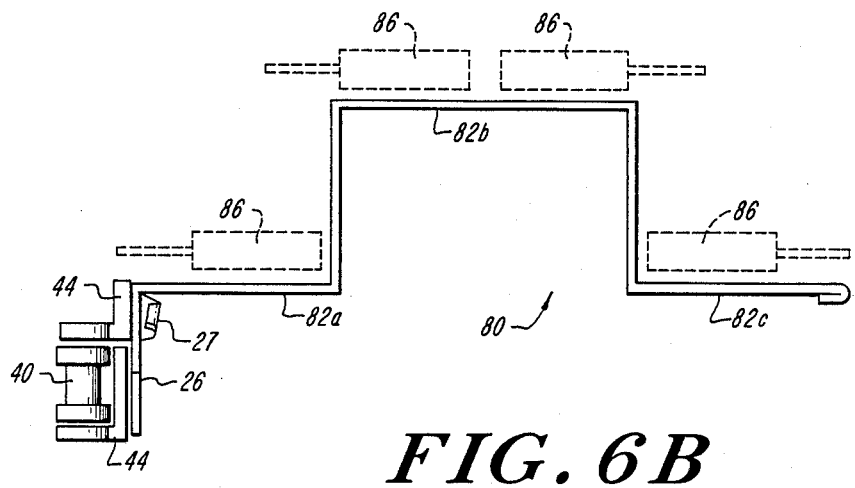

FIG. 6B shows a section corresponding to the section FIG. 4C, of a tray 80 according to another embodiment of the invention. This tray is a pyramidal tiered tray having a raised central portion 82b, and having lower inner and outer edge tiers 82a, 82c, respectively. Shown in phantom are stick products 86 arrayed on adjacent tiers for accessing from two different sides of a conveyor line.

It will be appreciated that although the invention has been disclosed with reference to particular trays and to an exemplary system of an illustrative embodiment, and has further been illustrated by reference to a particular ice cream bar product, the invention is not limited thereto, but includes trays having more or fewer tiers in differing orientations. The two-tiered tray of FIG. 6A is presently preferred for its adaptability to existing production lines.

Furthermore, the dimensions of each tier need not be identical and may be varied. Thus, as shown in FIG. 6A, the lowest tier may be of greater width than the upper tiers. The pyramid tray of FIG. 6B with one or more raised central tiers allows work station access or product shingling from both sides of the conveyor line. The invention being thus disclosed, further variations and modifications will occur to those skilled in the art, and all such variations and modifications are intended to be within the scope of the invention, as defined by the following claims.

What is claimed is:

1. A comestible conveyor line product tray for supporting one or more comestible portions in a comestible fabrication plant and conveying the portions along a production line, such tray comprising
   (a) a sheet member having an attachment region for affixing the sheet to a conveyor,
   (b) a stepped support region extending from the attachment region and including plural portion support tables, each said table defined by a substantially horizontal region of the sheet member having opposed inner and outer edges, and
   (c) at least one substantially vertical region extending between an inner edge of a first said table and an outer edge of of second said table, thereby defining vertically and horizontally offset portion support tables of said stepped support region.

2. A comestible conveyor line product tray according to claim 1, wherein the attachment region is oriented for attachment to a conveyor moving along a first direction of motion, and wherein the substantially vertical regions are parallel to said direction of motion.

3. A comestible conveyor line product tray according to claim 1, wherein the portion support tables of one level each have a horizontal dimension smaller than a horizontal dimension of a product to be supported thereon.

4. A comestible conveyor line product tray according to claim 2, wherein the support region extends from an inner portion support table to an outer portion support table located proximal to an outer edge of the tray, and wherein said outer portion support table is vertically offset lower than said inner portion support table.

5. A system comprising the combination of a comestible production line having a conveyor, and a plurality of trays according to claim 4 attached to the conveyor.

6. An ice cream conveyor line tray having adjacent tiered product support regions each said support region being vertically and horizontally offset from an adjacent support region.

7. A comestible product tray for attaching to a conveyor in a comestible production line and for supporting plural portions of frozen comestible along the line as the portions are treated by a treatment work station, such tray comprising
   attaching means for attaching the tray to a conveyor,
   a sheet member extending from the attaching means and including plural portion receiving regions, each said region having a substantially horizontal supporting face for supporting a portion of frozen comestible, each said supporting face extending from an inner edge to an opposing outer edge, said sheet member also including at least one connecting face extending transversely between a pair of said supporting faces from the outer edge of one face of the pair to the inner edge of the other face of the pair so as to define a stepped tray having vertically and horizontally offset portion receiving regions, so that an affixed component protrudes from a portion without contacting a vertically offset portion.

8. A tray according to claim 7, wherein a said connecting face is a vertical face.

9. A system comprising the combination of a conveyor oriented along a direction of conveyor motion and a plurality of trays according to claim 7 attached to the conveyor, wherein the connecting faces of said trays are oriented parallel to said direction of motion.

10. A system according to claim 9, wherein the horizontal supporting faces of each said tiered tray are spaced lower with increasing distance from the attaching means.

11. A system according to claim 9, wherein the support region of each tray includes tiered portion support regions extending from an inner supporting face to an outer supporting face proximal to an outer edge of the tray, and wherein each said outer supporting face is vertically offset lower than said inner supporting face of said tray.

12. In a method of forming frozen comestible products by depositing product portions on a support tray conveyed along a horizontal direction of motion and affixing a component to each portion, such component projecting from the portion, the improvement comprising the steps of depositing said product portions on a tray having plural vertically offset product support regions for receiving the said portions, so that an affixed component protrudes from a portion without contacting a vertically offset portion.

13. The improved method of claim 12, wherein the step of affixing a component projecting from a portion includes the step of affixing a stick to the portion such that the stick of a portion resting on a product support region of a tray overlies a portion on an adjacent product support region of the tray which is vertically offset therebelow.

14. In a method of forming frozen comestible products by fabricating plural product portions on a support tray conveyed along a comestible production line past product-forming work stations, wherein a fabricated product portion has a prescribed horizontal dimension, the improvement comprising fabricating said product portions on a tray having plural tiered product support regions, a said support region having a horizontal dimension less than the prescribed dimension.

15. The improved method of claim 14, including the step of fabricating the product portions in a shingled array on the support tray.

16. An ice cream conveyor line tray having adjacent tiered product support regions each said support region having opposed inner and outer edges, and wherein a support region is vertically and horizontally offset from an adjacent support region by a continuous portion of the tray extending between an inner edge of the support region and an outer edge of the adjacent support region so as to form a stepped product support surface.

17. A tray according to claim 16, including an outer support region adjacent to an outer edge of the tray, and wherein the outer support region is lower than a support region adjacent thereto.

18. A tray according to claim 17, wherein the tray includes a flange region for attachment to a conveyor, and a succession of tiers along a direction extending from said flange region, said tiers being lower with increasing distance from the flange.

19. A tray according to claim 18 having no more than three tiers.

20. A tray according to claim 16, including a central, an inner and an outer tier, wherein said central tier is higher than said inner and said outer tiers.

* * * * *